(12) United States Patent
Li et al.

(10) Patent No.: US 8,699,840 B2
(45) Date of Patent: Apr. 15, 2014

(54) WAVEGUIDES CONFIGURED TO SIMULTANEOUSLY GUIDE ELECTROMAGNETIC WAVES OF DIFFERENT WAVELENGTHS

(75) Inventors: Guifang Li, Oviedo, FL (US); Fatih Yaman, Monmouth Junction, NJ (US)

(73) Assignee: University of Central Florida Research Foundation, Inc.

( * ) Notice: Subject to any disclaimer, the term of this patent is extended or adjusted under 35 U.S.C. 154(b) by 291 days.

(21) Appl. No.: 13/315,723

(22) Filed: Dec. 9, 2011

(65) Prior Publication Data

US 2012/0148207 A1 Jun. 14, 2012

Related U.S. Application Data

(60) Provisional application No. 61/421,395, filed on Dec. 9, 2010.

(51) Int. Cl.
*G02B 6/02* (2006.01)
*G02B 6/32* (2006.01)
*G02B 6/28* (2006.01)

(52) U.S. Cl.
USPC .............................. 385/126; 385/124; 385/125

(58) Field of Classification Search
USPC .................................................... 385/123–128
See application file for complete search history.

(56) References Cited

U.S. PATENT DOCUMENTS 7,821,704 B1 * 10/2010 Pepper et al. ................. 359/344

* cited by examiner

*Primary Examiner* — Uyen Chau N Le
*Assistant Examiner* — Michael Mooney
(74) *Attorney, Agent, or Firm* — Thomas | Horstemeyer, LLP (57) ABSTRACT

In one embodiment, an waveguide includes a primary core configured to guide electromagnetic waves having relatively long wavelengths, a unit cell having a core configured to guide electromagnetic waves having relatively short wavelengths, the relatively long wavelengths being at least twice as long as the relatively short wavelengths, and a cladding material that surrounds the primary core and the unit cell.

27 Claims, 11 Drawing Sheets
(4 of 11 Drawing Sheet(s) Filed in Color)

WAVEGUIDES CONFIGURED TO SIMULTANEOUSLY GUIDE ELECTROMAGNETIC WAVES OF DIFFERENT WAVELENGTHS

CROSS-REFERENCE TO RELATED APPLICATION(S)

This application claims priority to U.S. Provisional Application Ser. No. 61/421,395, filed Dec. 9, 2010, which is hereby incorporated by reference herein in its entirety.

BACKGROUND

Optical fibers are often used to transmit electromagnetic signals. As a result of the geometry of such fibers, each fiber is typically configured to guide electromagnetic waves within only a limited range of wavelengths. In situations in which electromagnetic signals having significantly different wavelengths (e.g., signals from opposite ends of the electromagnetic spectrum) are to be transmitted, multiple fibers are typically required, one for each wavelength. The need for multiple fibers increases the complexity of the systems in which the fibers are used. It would therefore be desirable to have optical fibers or other waveguides that can transmit both relatively short and relatively long wavelength electromagnetic signals.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure may be better understood with reference to the following figures. Matching reference numerals designate corresponding parts throughout the figures, which are not necessarily drawn to scale.

FIGS. 14A-14C illustrate the intensity profile of the fundamental mode guided by the simulated photonic crystal waveguide.

FIGS. 15A-15C illustrate the intensity profile of the fundamental mode guided by the simulated photonic crystal waveguide when the infrared photonic crystal waveguide at the center is removed.

DETAILED DESCRIPTION

As described above, conventional optical fibers are typically configured to guide electromagnetic waves within only a limited range of wavelengths. As a result, such fibers are not able to guide electromagnetic waves having significantly different wavelengths, and multiple fibers are typically required when electromagnetic signals having disparate wavelengths are to be simultaneously transmitted. Described herein, however, are waveguides that are capable of simultaneously transmitting both relatively short wavelength and relatively long wavelength electromagnetic signals. In some cases, the waveguides can simultaneously transmit signals having at least a two-fold difference in wavelength. In some embodiments, the waveguides comprise composite photonic crystal waveguides that include one or more unit cells each capable of transmitting relatively short wavelength electromagnetic signals and a primary core that is capable of transmitting relatively long wavelength electromagnetic signals. As used herein, the term "waveguide" is an inclusive term that refers to any conduit that is adapted to guide electromagnetic waves, including waves having very short wavelengths (e.g., gamma rays) to waves having very long wavelengths (e.g., radio waves). Accordingly, as used herein, the term "waveguide" includes optical fibers, which are typically used to guide light waves.

In the following disclosure, various embodiments are described. It is to be understood that those embodiments are example implementations of the disclosed inventions and that alternative embodiments are possible. All such embodiments are intended to fall within the scope of this disclosure.

The composite photonic crystal waveguides described below have a fractal-like geometry in the sense that subcomponents, referred to herein as unit cells, of the composite photonic crystal waveguides themselves function as photonic crystal waveguides. This gives the composite photonic crystal waveguides the ability to simultaneously guide waves having very different wavelengths, including waves from opposite ends of the electromagnetic spectrum. The composite photonic crystal waveguides enable nonlinear optical interactions involving electromagnetic waves in different bands from optical to infrared, to terahertz, to millimeter wave, to microwave. Such composite photonic crystal waveguides can be used in many different applications, including reducing the size and weight for cabling on Navy vessels as well as applications in nonlinear imaging, for example, excitation in the visible/near-infrared band, and fluorescence in the infrared and microwave bands.

Figure 1:
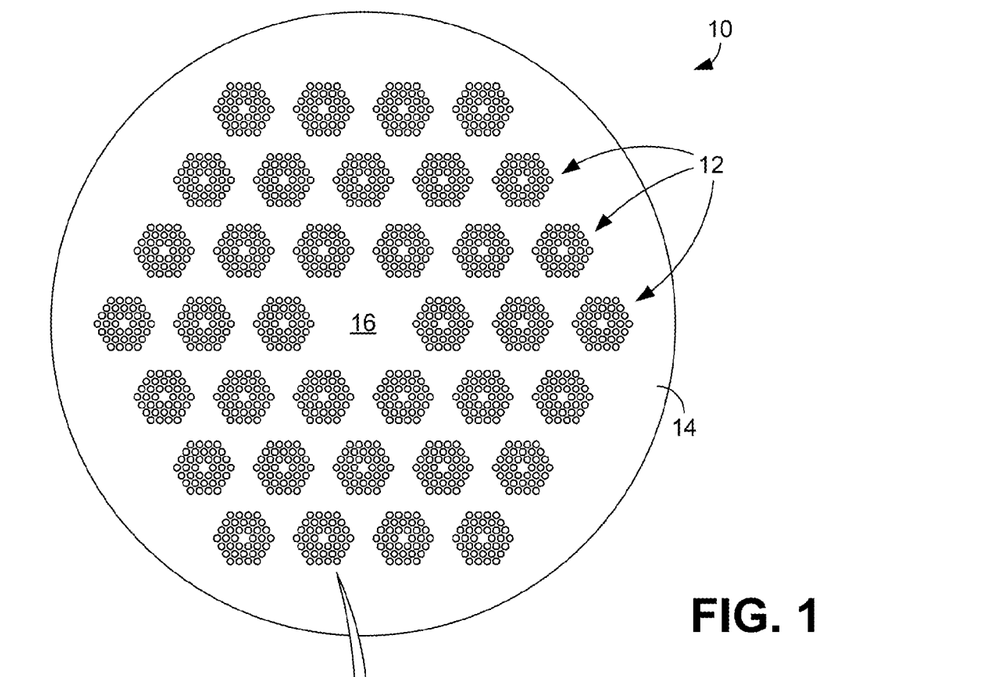
FIG. 1 is a cross-sectional view of a first embodiment of a composite photonic crystal waveguide, the waveguide including multiple peripheral unit cells.

FIG. 1 illustrates a first example composite photonic crystal waveguide 10. The waveguide 10 comprises multiple peripheral unit cells 12 that are encased in a single, continuous host or cladding material 14. By way of example, the cladding material 14 is composed of silica having an index of refraction in the range of approximately 1 to 2. In the embodiment shown in FIG. 1, the unit cells 12 surround a primary core 16 of the waveguide 10 and are arrayed in a hexagonal configuration in which they are equally spaced from each other across the cross-section of the waveguide. While a hexagonal pattern is shown, it will be understood that, in every case a hexagonal pattern is shown or described in this disclosure, alternative configurations are possible. Each unit cell 12 is capable of transmitting relatively short wavelength electromagnetic signals.

Figure 2:
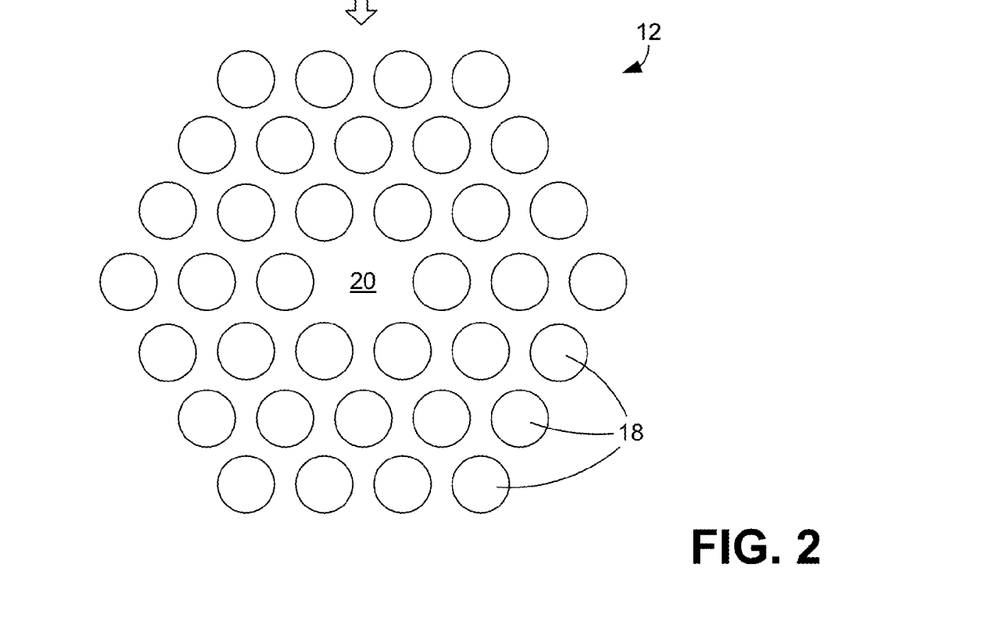
FIG. 2 is a detail view of an embodiment of one of the peripheral unit cells shown in FIG. 1.

FIG. 2 shows an example configuration for one or more of the peripheral unit cells 12 shown in FIG. 1. As is illustrated in FIG. 2, each unit cell 12 comprises multiple channels 18 formed within the cladding that, similar to the configuration of the unit cells relative to the entire waveguide 10, surround a core 20 and are arrayed in a hexagonal pattern. The channels 18 can comprise open holes or tubes that comprise only air. Alternatively, the channels 18 can be composed of a material that, like air, has a low index of refraction. Because the index of refraction of the channels 18 is lower than the index of refraction of the cladding material 14 that forms the cores 20, each unit cell 12 functions as an index guiding photonic crystal waveguide and confines relatively short wavelength electromagnetic waves to its core and therefore can be used to transmit relatively short electromagnetic signals along the length of the composite photonic crystal waveguide 10 in an index guiding scheme.

Referring back to FIG. 1, the peripheral unit cells 12 together function as a relatively low index cladding for the primary core 16 of the waveguide 10. As a result, the unit cells 12 and the primary core 16 together function as a photonic crystal waveguide that confines relatively long wavelength electromagnetic waves to the primary core. Therefore, the primary core 16 can be used to transmit relatively long electromagnetic signals along the length of the composite photonic crystal waveguide 10 also in an index guiding scheme.

The dimensions of composite photonic crystal waveguide 10 are dictated by the wavelengths it is intended to guide. In some embodiments, the difference in wavelengths between the signals transmitted by the unit cells 12 (i.e., along the cores 20) and the signals transmitted by the waveguide 10 as a whole (i.e., along the primary core 16) are at least different by a factor of two, meaning that the relatively long wavelengths are at least approximately twice as long as the relatively short wavelengths. For example, the relatively long wavelengths are approximately three to four times as long as the relatively short wavelengths. Of course, the relatively long wavelengths can be much longer than the relatively short wavelengths. For example, the relatively long wavelengths can be one or more orders of magnitude longer than the relatively short wavelengths. To cite an example, the cores 20 can transmit electromagnetic signals having wavelengths ranging from approximately 0.2 microns ($\mu m$) to 2 $\mu m$ and the primary core 16 can transmit electromagnetic signals having wavelengths ranging from approximately 10 $\mu m$ to 100 $\mu m$. In such a case, the diameters of the cores 20 range from approximately 1 $\mu m$ to 20 $\mu m$, and the diameter of the primary core 16 ranges from approximately 50 $\mu m$ to 500 $\mu m$ in diameter. As a further example, the cores 20 can transmit electromagnetic signals having wavelengths ranging from approximately 0.2 $\mu m$ to 2 $\mu m$ and the primary core 16 can transmit electromagnetic signals having wavelengths ranging from approximately 100 $\mu m$ to 1000 $\mu m$. In such a case, the diameters of the cores 20 range from approximately 1 $\mu m$ to 20 $\mu m$, and the diameter of the primary core 16 ranges from approximately 100 $\mu m$ to 1000 $\mu m$ in diameter.

Figure 3:
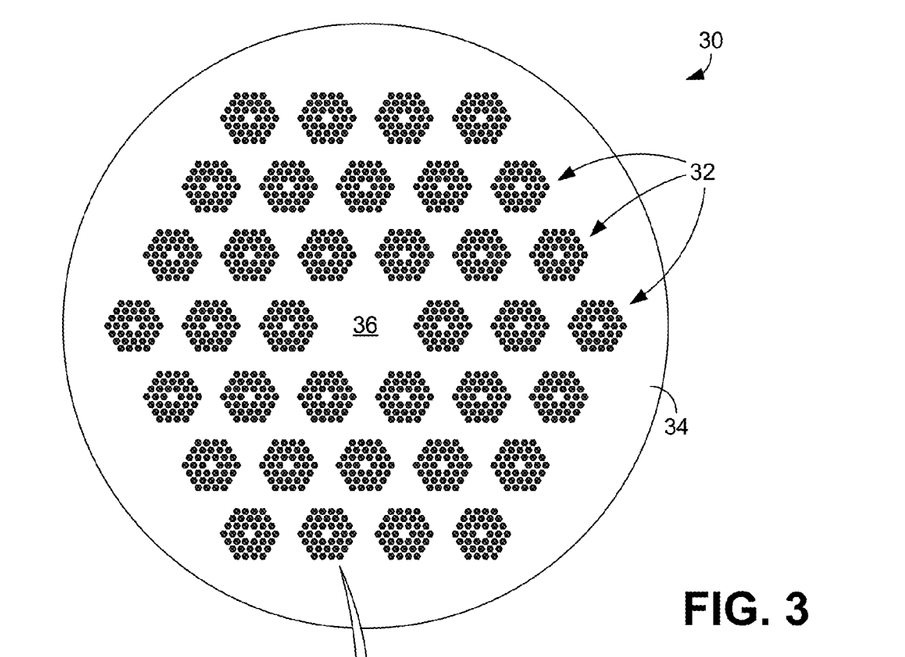
FIG. 3 is a cross-sectional view of a second embodiment of a composite photonic crystal waveguide, the waveguide including multiple peripheral unit cells.

FIG. 3 illustrates a second example composite photonic crystal waveguide 30. The waveguide 30 shares several similarities with the waveguide 10 shown in FIG. 1. Therefore, the waveguide 30 comprises multiple peripheral unit cells 32 that are encased in a single, continuous cladding material 34. The unit cells 32 surround a primary core 36 of the waveguide 30 are arrayed in a hexagonal pattern. Each unit cell 32 is capable of transmitting relatively small wavelength electromagnetic signals.

Figure 4:
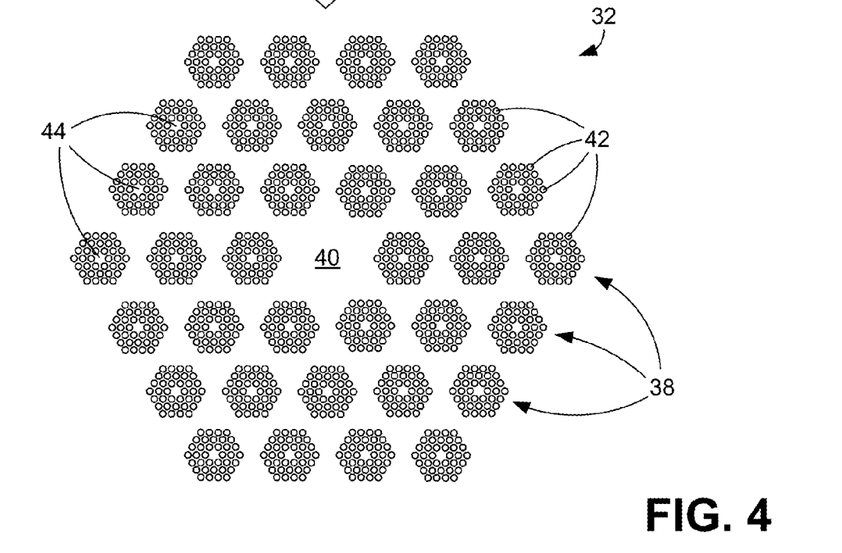
FIG. 4 is a detail view of an embodiment of one of the peripheral unit cells shown in FIG. 3.

FIG. 4 shows an example configuration for one or more of the unit cells 32 shown in FIG. 3, which differs from the configuration of the unit cell 12 shown in FIG. 2. As is illustrated in FIG. 4, each unit cell 32 comprises multiple sub-unit cells 38 that surround a core 40 of the cell are arrayed in a hexagonal pattern. Each sub-unit cell 38 comprises multiple channels 42 surrounding a core 44 of the sub-unit cell that are arrayed in a hexagonal pattern. Each sub-unit cell 38 can transmit even smaller wavelength electromagnetic signals that each of the unit cells 32 can transmit.

The channels 42 are either open holes or tubes, or are composed of a material that, like air, has a low index of refraction. Because the index of refraction of the channels 42 is lower than the index of refraction of the cladding material 34 that forms the cores 44, the sub-unit cells 38 each individually functions as a photonic crystal waveguide and confines very short wavelength electromagnetic signals to its core. Likewise, because the index of refraction of the sub-unit cells 38 (which are comprised by the low index channels 42) have an effective index of refraction that is lower than the cores 40 of the unit cells 32, the unit cells also individually function as a photonic crystal waveguides and confine short wavelength electromagnetic signals to their cores.

Referring back to FIG. 3, the peripheral unit cells 32 together function as a relatively low index cladding for the primary core 36. As a result, the unit cells 32 and the primary core 36 together function as a photonic crystal waveguide that confines relatively long wavelength electromagnetic signals to the primary core. Therefore, the composite photonic crystal waveguide 30 can be used to transmit three separate bands of wavelengths: relatively long wavelength electromagnetic signals (through core 36), relatively short wavelength electromagnetic signals (through cores 40), and even shorter wavelength electromagnetic signals (through cores 44), in each case using index guiding. It will be appreciated from FIGS. 1-4 that even greater numbers of wavelength bands can be transmitted if further levels of sub-unit cells are used. For example, four wavelength bands can be used if each channel 42 is replaced with an array of channels that surrounds a core.

As with the composite photonic crystal waveguide 10, the dimensions of the composite photonic crystal waveguide 30 are dictated by the wavelengths the waveguides are intended to guide. By way of example, the cores 40 of the unit cells 32 and the primary core 36 can be similar in dimensions and function to those of the unit cells 12 and primary core 16 of the waveguide 10 described above. The cores 44 of the sub-unit cells 38 can, for example, have diameters that range from approximately 1 $\mu m$ to 20 $\mu m$.

Figure 5:
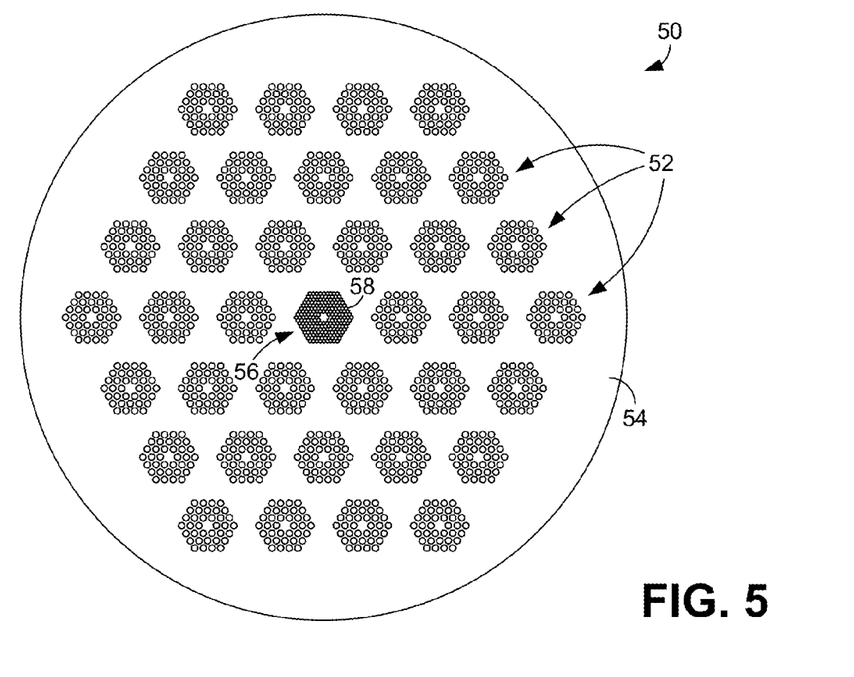
FIG. 5 is a cross-sectional view of a third embodiment of a composite photonic crystal waveguide, the waveguide including multiple peripheral unit cells and a center unit cell.

FIG. 5 illustrates a third example composite photonic crystal waveguide 50. More particularly, FIG. 5 illustrates a hybrid composite photonic crystal waveguide 50 that uses both index guiding and band-gap guiding. The waveguide 50 comprises multiple peripheral unit cells 52 that are encased in a single, continuous cladding material 54. The unit cells 52 surround a primary core 56 of the waveguide 50 and are arrayed in a hexagonal pattern. By way of example, the unit cells 52 have a construction similar to that described in relation to FIG. 2 and therefore function as photonic crystal waveguides that transmit relatively short wavelength electromagnetic signals via index guiding.

The peripheral unit cells 52 together function as a low index cladding relative to the primary core 56. As a result, the unit cells 52 and the primary core 56 together function as a photonic crystal waveguide that confines relatively long wavelength electromagnetic waves to the primary core in an index guiding scheme.

Figure 6:
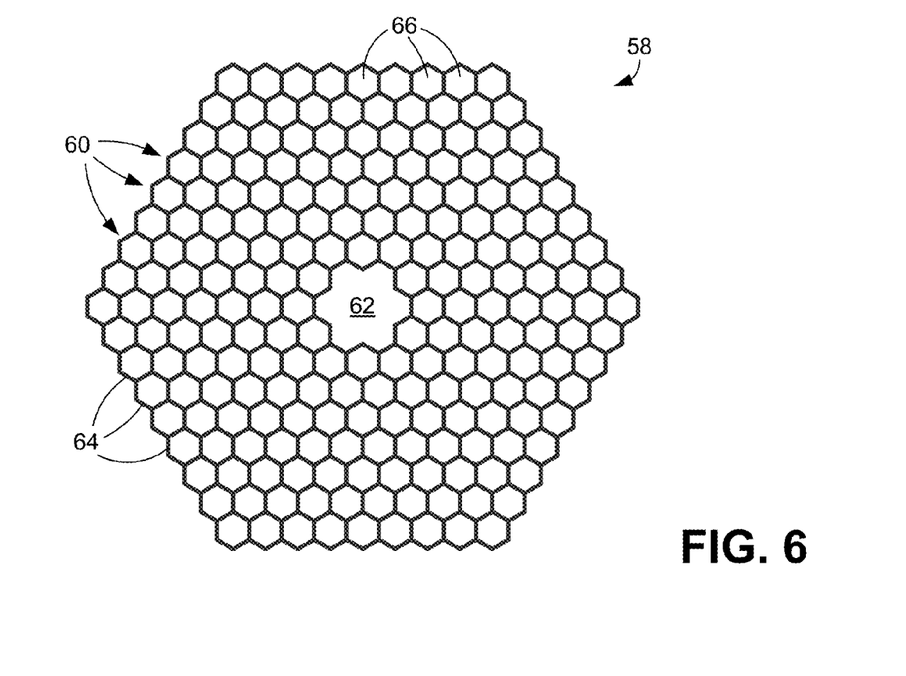
FIG. 6 is a detail view of an embodiment of the center unit cell shown in FIG. 5.

In the embodiment of FIG. 5, however, a center unit cell 58 is provided within the primary core 56 of the composite photonic crystal waveguide 50. FIG. 6 shows an example configuration for the center unit cell 58. As is illustrated in FIG. 6, the center unit cell 58 comprises multiple hexagonal tubes 60 that are arranged in a tightly packed hexagon that surrounds a central channel 62, which is either an open channel or is composed of a material that has a low index of refraction. Each of the tubes 60 comprises outer walls 64 that define an inner channel 66 that is likewise open or composed of a material having a low index of refraction. By way of example, the walls 64 of the tubes 60 are composed of silica and have an index of refraction of approximately 1 to 2.

The unit cell 58 functions as a photonic crystal waveguide that confines electromagnetic waves to the core via band-gap guiding. In some embodiments, the electromagnetic waves guided by the center unit cell 58 can be similar in wavelength to those guided by the peripheral unit cells 52. In alternative embodiments, the center unit cell 58 can be significantly smaller than the peripheral unit cells 52, in which case the center unit cell can be used to guide wavelengths even smaller than those guided by the peripheral unit cells 52.

Referring back to FIG. 5, the peripheral unit cells 52 together function as a relatively low index cladding for the primary core 56. As a result, the peripheral unit cells 52 and the primary core 56 together function as a photonic crystal waveguide that confines relatively long wavelength electromagnetic waves to the primary core via index guiding.

As with the previous embodiments, the dimensions of the composite photonic crystal waveguide 50 are dictated by the wavelengths it is intended to guide. In some embodiments, the cores of the peripheral unit cells 52 and the primary core 56 can be similar in dimensions to those of the unit cells 12 and primary core 16 of the waveguide 10 described above.

Figure 7:
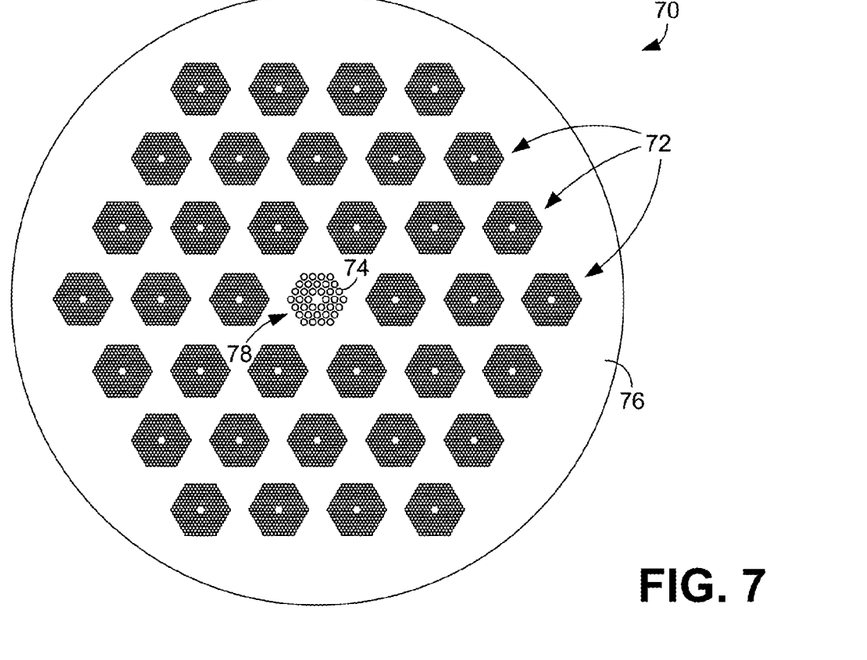
FIG. 7 is a cross-sectional view of a fourth embodiment of a composite photonic crystal waveguide, the waveguide including multiple peripheral unit cells and a center unit cell.

FIG. 7 illustrates a fourth example composite photonic crystal waveguide 70. Like the waveguide 50 shown in FIG. 5, the waveguide 70 is a hybrid composite photonic crystal waveguide. However, the waveguide 70 is the inverse of the waveguide 50 of FIG. 5 in the sense that, instead of comprising peripheral unit cells that are index guiding and a center unit cell that is band-gap guiding, the waveguide 70 has band-gap guiding peripheral unit cells 72 and an index guiding center unit cell 74. By way of example, the peripheral unit cells 72 have a construction similar to the unit cell 58 shown in FIG. 6, and the center unit cell 74 has a construction similar to the unit cell 12 shown in FIG. 2. The unit cells 72, 74 are encased in a single, continuous cladding material 76, which also forms the primary core 78 and the cores of the peripheral unit cells 72.

As with the other embodiments, the peripheral unit cells 72 and the center unit cell 74 can each guide relatively short wavelength electromagnetic signals. As mentioned above, the peripheral unit cells 72 guide their signals using band-gap guiding and the center unit cell 74 guides its signals using index guiding. In addition, relatively long wavelength electromagnetic signals can be guided along the primary core 78 via band-gap guiding because the peripheral unit cells 72 reflect the signals back into the primary core 78 of the waveguide 70. The cores of the peripheral unit cells 72 and the primary core 78 can be similar in dimensions to those of the unit cells 12 and primary core 16 of the waveguide 10 described above. The core of the central unit cell 74 can have dimensions that are similar to or smaller than the dimensions of the cores of the peripheral unit cells 72.

Figure 8:
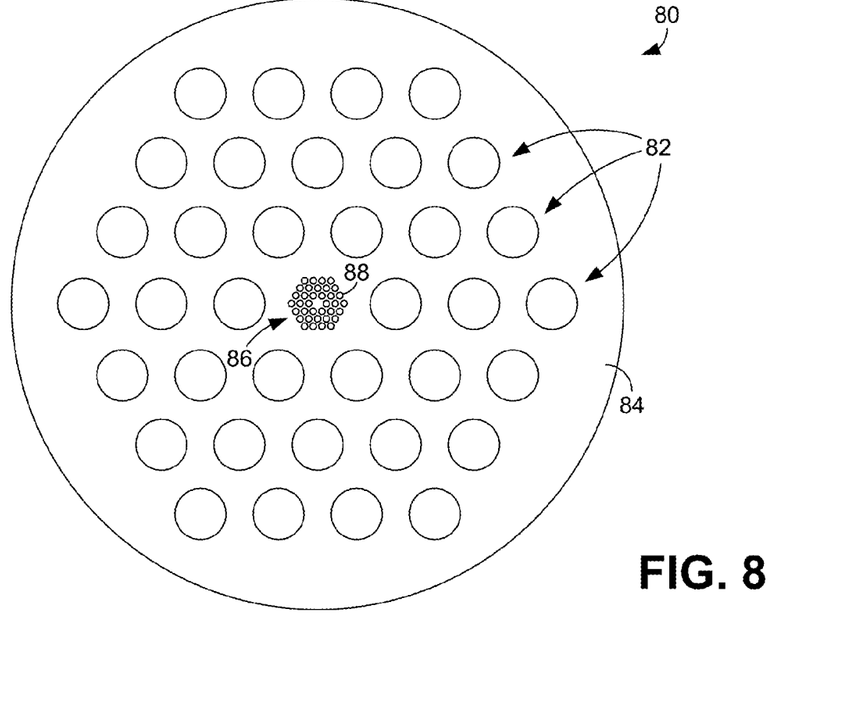
FIG. 8 is a cross-sectional view of a fifth embodiment of a composite photonic crystal waveguide, the waveguide including multiple peripheral channels and a center unit cell.

FIG. 8 illustrates a fifth example composite photonic crystal waveguide 80, which can be used when peripheral guiding of short wavelength electromagnetic signals is not desired. The waveguide 80 comprises multiple channels 82 that are defined by a single, continuous cladding material 84. The channels 82 are either open and comprise only air, or are composed of a material that, like air, has a low index of refraction. The channels 82 surround a primary core 86 of the waveguide 80 and are arrayed in a hexagonal arrangement. Because the index of refraction of the channels 82 is lower than the index of refraction of the primary core 86, the waveguide 80 confines relatively long wavelength electromagnetic signals to the core 86 via index guiding.

Located within the primary core 86 is a center unit cell 88 that can have a configuration similar to the unit cell 12 shown in FIG. 2. The unit cell 88 can therefore guide relatively short wavelength electromagnetic signals along its own core using index guiding.

As with the previous embodiments, the dimensions of the composite photonic crystal waveguide 80 are dictated by the wavelengths it is intended to guide. In some embodiments, the cores of the center unit cell 88 and the primary core 86 can be similar in dimensions to those of the unit cells 12 and primary core 16 of the waveguide 10 described above.

Figure 9:
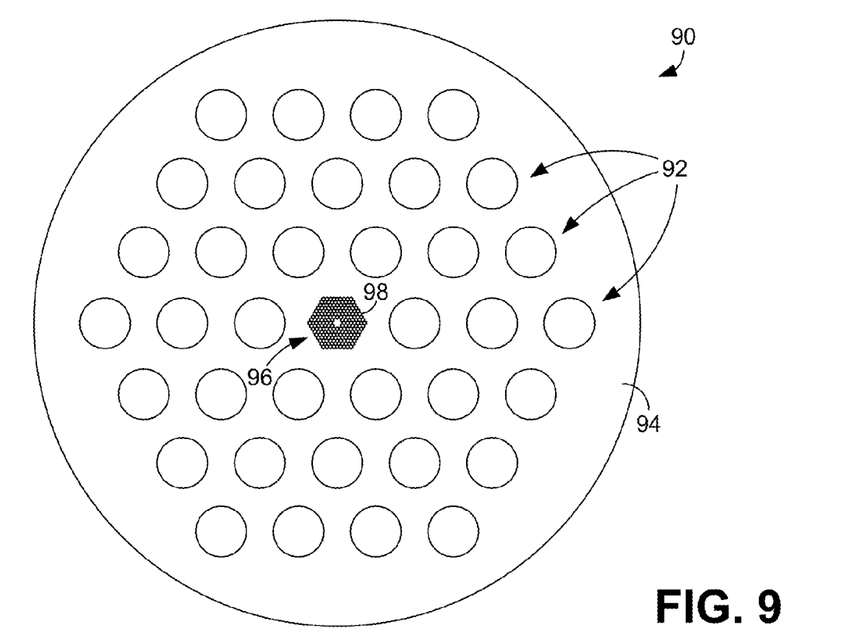
FIG. 9 is a cross-sectional view of a sixth embodiment of a composite photonic crystal waveguide, the waveguide including multiple peripheral channels and a center unit cell.

FIG. 9 illustrates a sixth example composite photonic crystal waveguide 90, which is very similar to the waveguide 80. Accordingly, the waveguide 90 comprises multiple channels 92 that are defined by a single, continuous cladding material 94. The channels 92 surround a primary core 96 of the waveguide 90 and are arrayed in a hexagonal configuration. Located within the primary core 96 is a center unit cell 98. The center unit cell 98, however, has a configuration similar to the unit cell 58 shown in FIG. 6. The unit cell 98 therefore guides relatively short wavelength electromagnetic signals along its own core using band-gap guiding.

Figure 10:
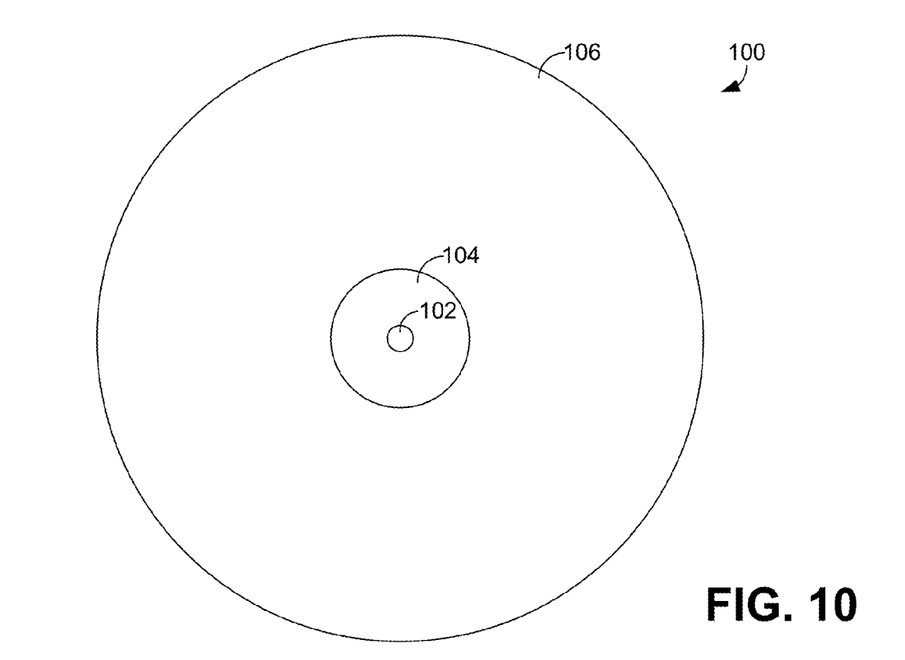
FIG. 10 is a cross-sectional view of an alternative optical waveguide that is configured to guide electromagnetic waves of different wavelengths.

FIG. 10 illustrates an embodiment of a further waveguide 100 that can transmit electromagnetic signals having significantly different wavelengths. The waveguide generally comprises a core 102 that is surrounded by an inner cladding 104, which is in turn surrounded by an outer cladding 106. The core 102 has a higher index of refraction than the inner cladding 104 and, therefore, relatively short wavelength electromagnetic waves are confined to the core 102 via index guiding. Although the inner cladding 104 has an index or refraction that is lower than the core 102, that index of refraction is higher than that of the outer cladding 106. Therefore, the inner cladding 104 can function as a core (concentric with the core 102) relative to the outer cladding 106 and relatively long wavelength electromagnetic waves can be guided by the inner cladding, also via index guiding. Such a waveguide configuration may be desirable when a low loss material is available for waveguide construction at the longer wavelengths. As above, the dimensions of waveguide 100 are also dictated by the wavelengths it is intended to guide.

Figure 11:
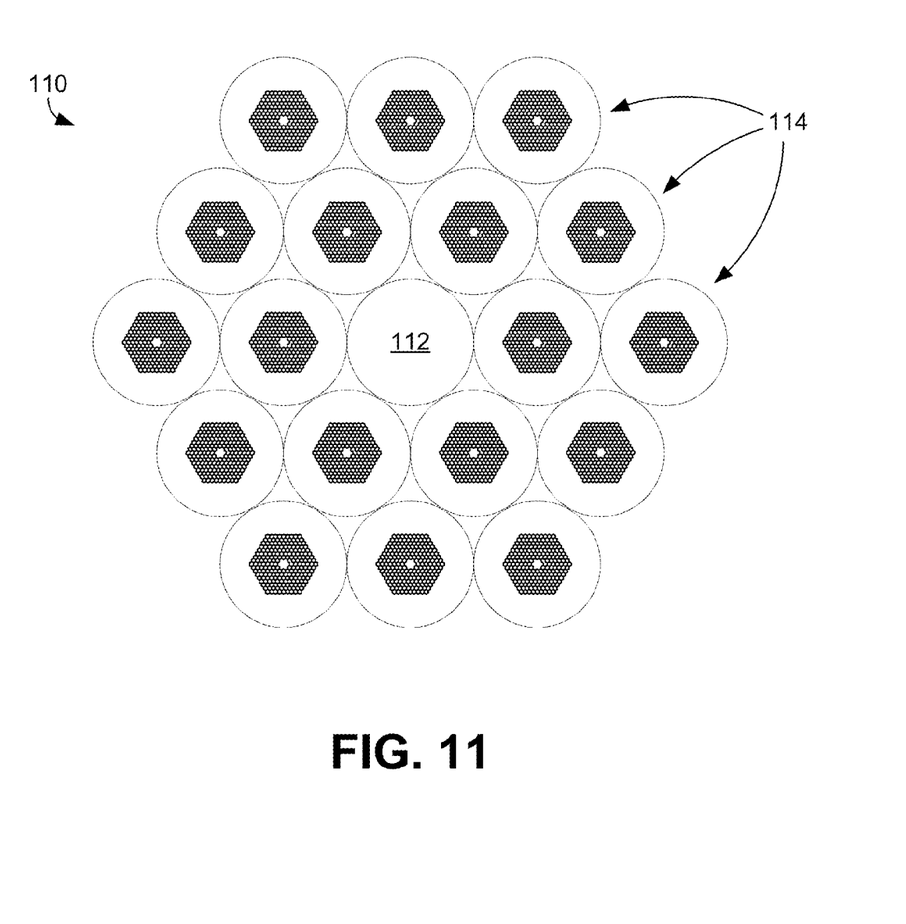
FIG. 11 is a cross-sectional view of an experimental waveguide that simulates the composite photonic crystal waveguide of FIG. 1.

A preliminary simulation was performed to prove that a composite photonic crystal waveguide can guide both near infrared and at the lower end of microwave wavelengths. A photonic crystal waveguide with dimensions necessary for guiding microwave wavelengths can be emulated by stacking commercially available photonic crystal waveguides that guide near-infrared wavelengths. FIG. 11 illustrates a waveguide 110 that comprises a central solid-core waveguide 112 that is surrounded by multiple photonic crystal waveguides 114 that are arranged in a hexagonal pattern. With this configuration, the waveguide 110 functions as an index guiding waveguide with a relatively high refractive index core and a relatively low refractive index cladding. The spacing between the holey regions defined by the channels of the waveguides 114 can be adjusted by reducing the diameters of the waveguides. If necessary, the effective index of the holey regions can also be adjusted by selectively dissolving the holey regions of the individual waveguides and increasing the air filling ratio, which in turn reduces the effective index.

Figure 12A:
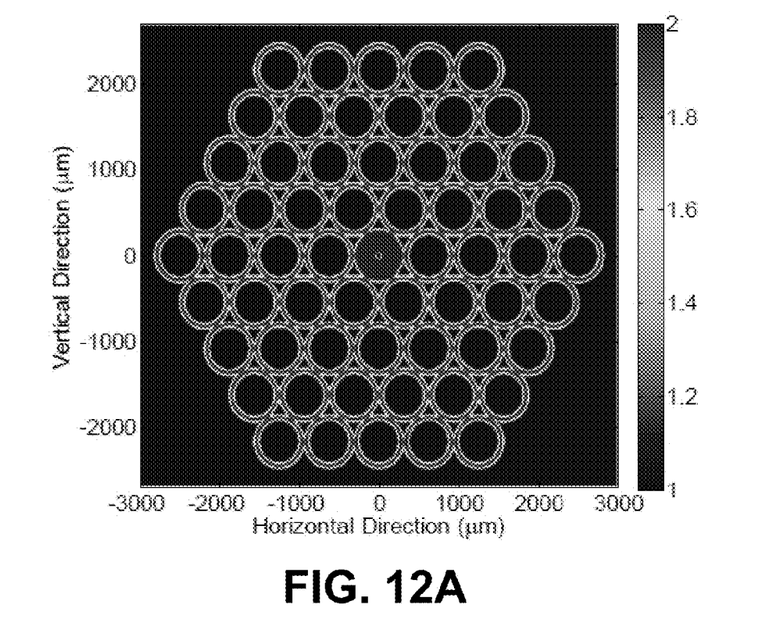
FIGS. 12A and 12B illustrate the refractive index distribution of the simulated photonic crystal waveguide.
Figure 13:
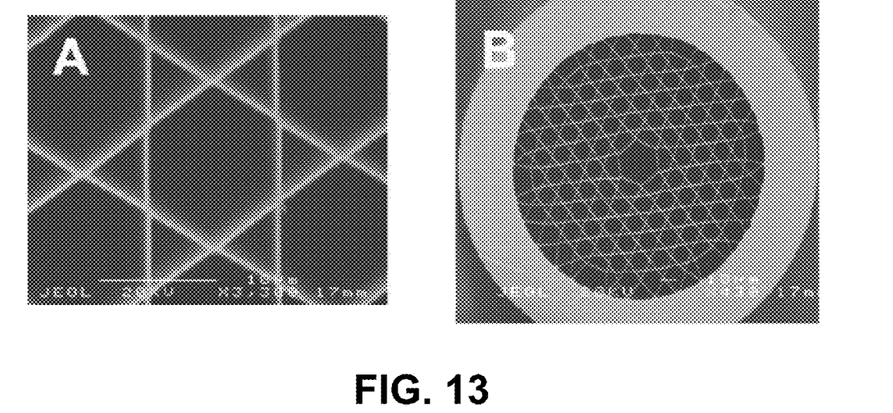
FIGS. 13A and 13B are cross-sectional views of a Kagome photonic crystal waveguide having interstitial holes between the main holes.
FIG. 13C is a graph that plots decibels as a function of wavelength for the waveguide of FIGS. 13A and 13B.
Figure 13C:
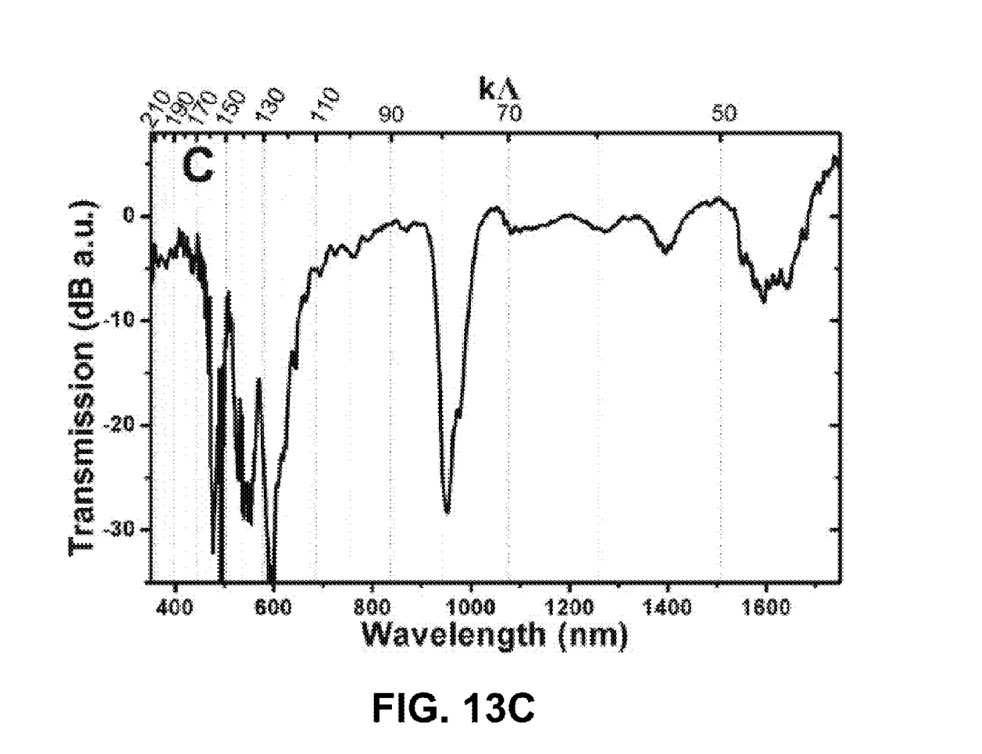

To determine whether such a structure would adequately guide microwave wavelengths, the fundamental mode guided by the waveguide 110 was simulated and calculated. FIG. 12A shows the refractive index distribution of the simulated photonic crystal waveguide. It is noted that, even though the structure in FIG. 12A is an approximation to the waveguide 110 because of the interstitial holes, it is still a better approximation to another well-known photonic lattice design Kagome photonic crystal waveguide shown in FIGS. 13A and 13B.

Figure 12B:
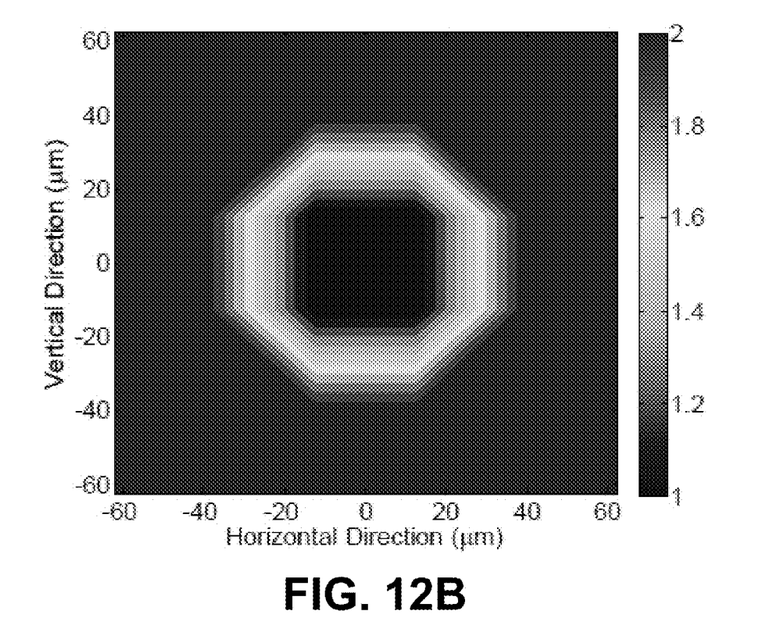

In the simulation, the outer and inner diameters of the channels are chosen to be 600 and 500 μm, which corresponds also to the pitch and hole diameter of the lattice. The infrared photonic crystal waveguide on the other hand has a pitch and hole diameter of 4 μm and 3.4 μm, respectively. The diameter of the hollow core is 10.5 μm. As it was computationally prohibitive to choose a grid size that could resolve the sub-micron-thick struts of the infrared photonic crystal waveguide to simulate the entire microwave photonic crystal waveguide, a more manageable grid size of 50×50 μm was chosen. The choice of the coarse grid resulted in approximating the holey region of the infrared photonic crystal waveguide as a circular hole at the very center, as shown in FIG. 12B.

Figure 14:
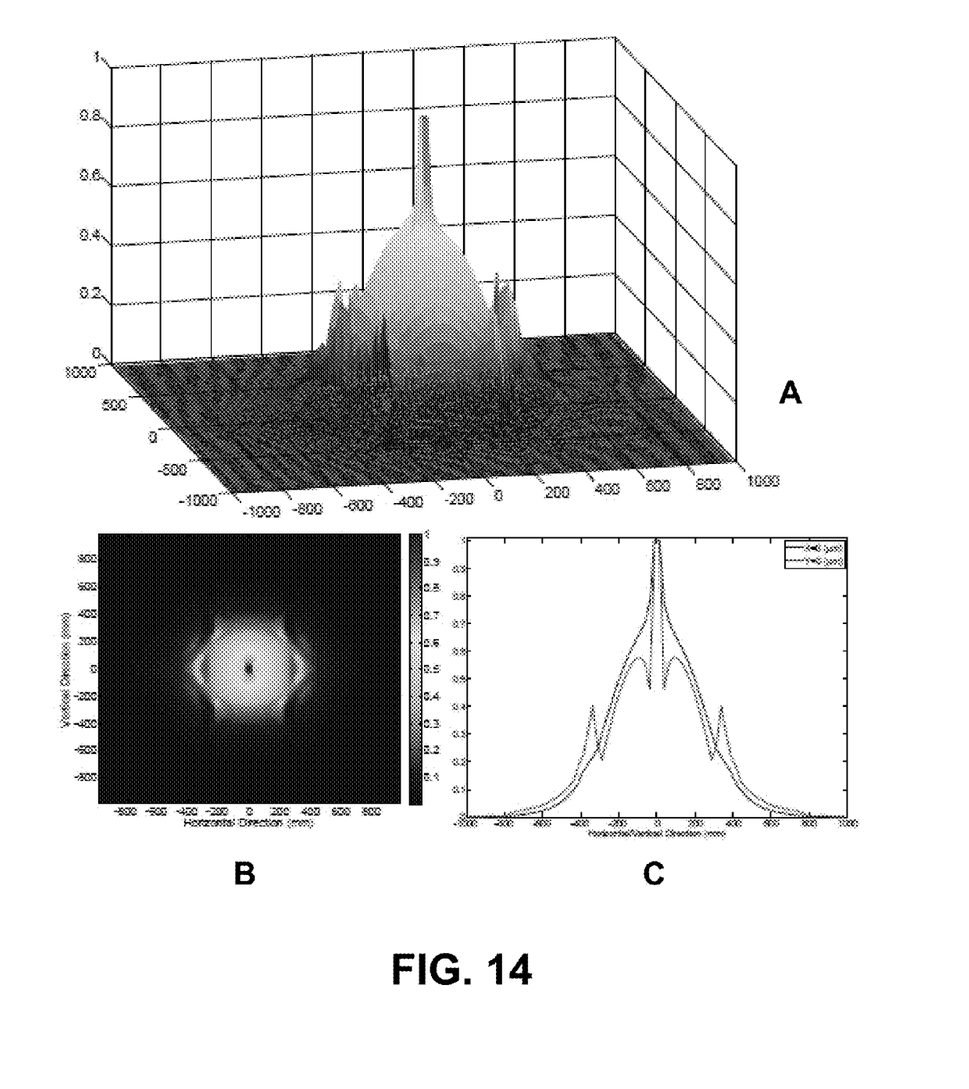
Figure 15:
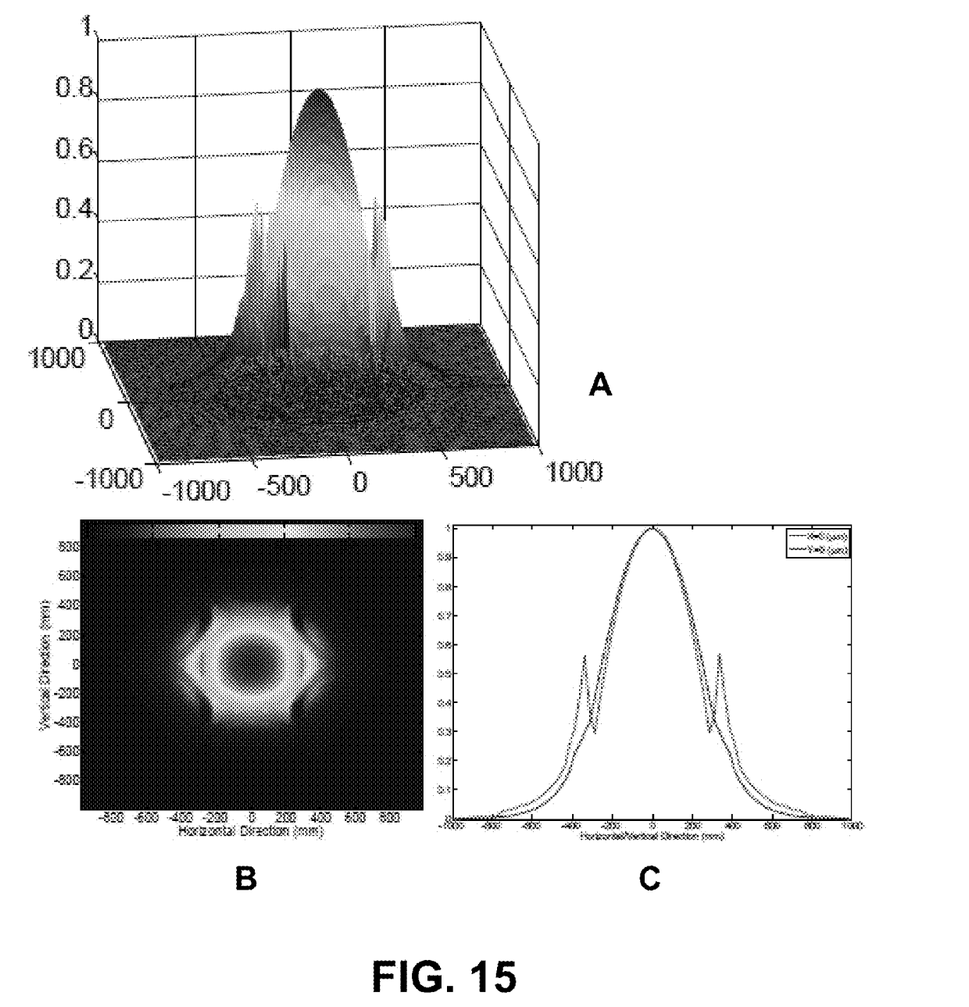

FIGS. 14A-14C show the intensity profile of the fundamental mode supported by the microwave guide, calculated at the wavelength of 1 millimeter (mm). For comparison, the simulations were repeated omitting the infrared PCF at the center, and the mode profile calculated in this case is shown in FIGS. 15A-15C.

Figure 16A:
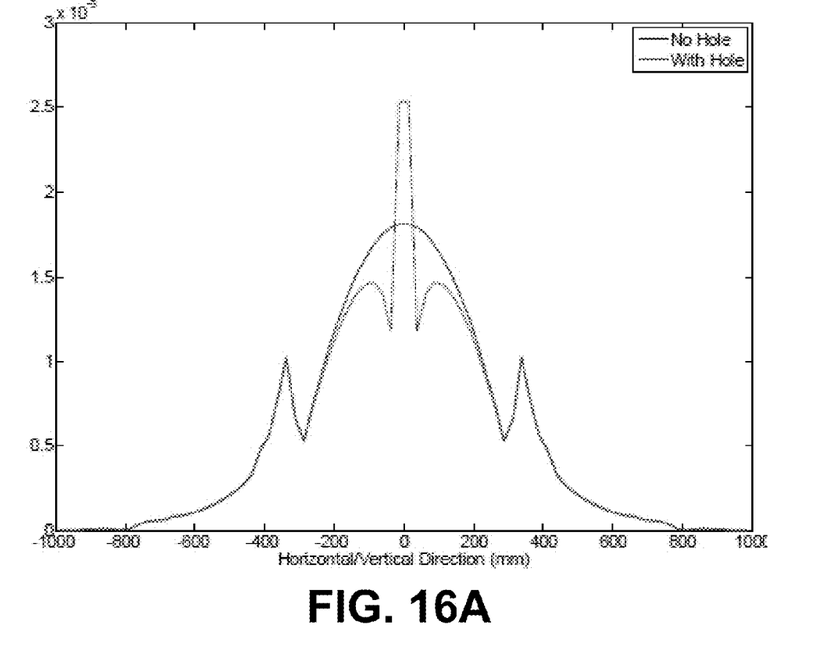
FIGS. 16A and 16B respectively illustrate the horizontal and vertical cross-sections of the field distributions compared when the hole at the center of the simulated photonic crystal waveguide is missing (solid blue) and present (dashed red).
Figure 16B:
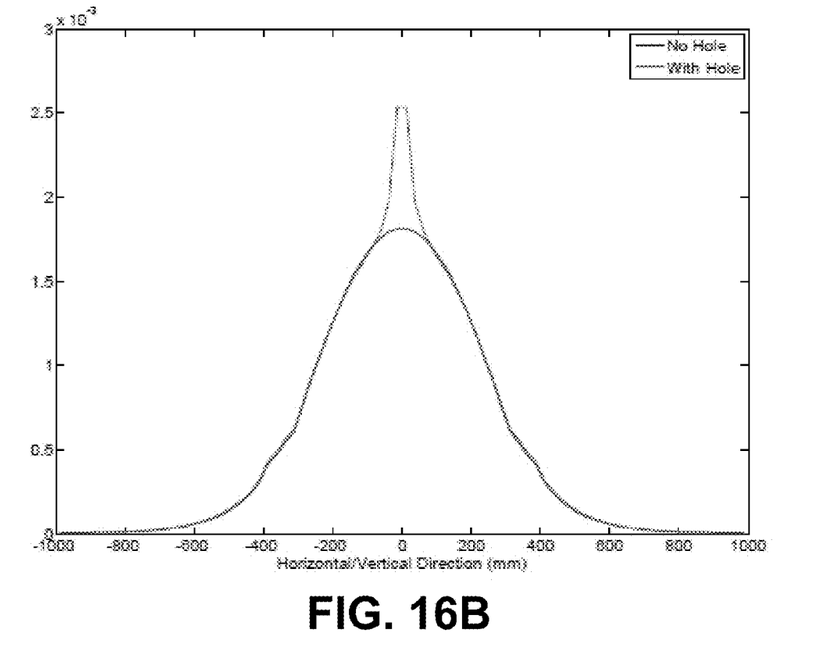

FIGS. 14A-14C show that the microwave field is confined in the solid core with decaying tails in the low effective index cladding. Comparison of FIG. 14A and FIG. 15A shows that, when the infrared photonic crystal waveguide is present at the center, some of the microwave field is concentrated in this holey region. Other than this concentration, the rest of the mode remains the same, as shown in FIGS. 16A and 16B. The increase in the intensity at the holey region is due to the boundary condition that dictates the continuity of the normal component of the displacement vector at the boundary. This can be satisfied only when the electric field at the low index region is larger than it is in the high index region. The ratio between the two is proportional to the square of the ratio of the refractive indices.

The concentration at the center hole can be quite useful for the applications where the overlap between the infrared and the microwave field needs to be maximized. In particular, if the waveguide is used as a medium for nonlinear interaction between the short and the long wavelength, this waveguide provides the dual advantage of both a high overlap between the two fields and also a tight confinement therefore a high intensity for the long wavelength.

Many variations on the embodiments described above are possible. For example, in many cases, index guiding arrangements can be replaced by band-gap guiding arrangements, and vice versa. Moreover, although many waveguide embodiments have been described that are configured to transmit two bands of wavelengths, three or more different bands of wavelengths can be guided, if desired. The waveguide described in relation to FIG. 3 provides an example of how greater numbers of wavelength bands can be guided by a composite photonic crystal waveguide.

The invention claimed is:

1. An waveguide configured to simultaneously transmit relatively short and long wavelength electromagnetic signals, the waveguide comprising:
   a primary core configured to guide electromagnetic waves having relatively long wavelengths;
   a unit cell having a core configured to guide electromagnetic waves having relatively short wavelengths, the relatively long wavelengths being at least twice long as the relatively short wavelengths; and
   a cladding material that surrounds the primary core and the unit cell.

2. The waveguide of claim 1, wherein the primary core is a solid core and is composed of the cladding material.

3. The waveguide of claim 1, wherein the waveguide comprises multiple unit cells, each having a core configured to guide electromagnetic waves having relatively short wavelengths, the relatively long wavelengths being at least twice as long as the relatively short wavelengths, the unit cells being arrayed in a hexagonal pattern around the primary core.

4. The waveguide of claim 3, wherein each unit cell comprises multiple open channels formed in the cladding material that are arrayed in a hexagonal pattern around the unit cell core and wherein the unit cells guide electromagnetic signals via index guiding.

5. The waveguide of claim 3, wherein each unit cell comprises multiple sub-units formed in the cladding material that are arrayed in a hexagonal pattern around the unit cell core, wherein each sub-unit cell comprises its own core.

6. The waveguide of claim 5, wherein each sub-unit cell comprises multiple open channels formed in the cladding material that are arrayed in a hexagonal pattern around the sub-unit cell core and wherein the sub-unit cells guide electromagnetic signals via index guiding.

7. The waveguide of claim 3, wherein each unit cell comprises multiple hexagonal tubes that are tightly packed in a hexagonal pattern around the unit cell core and wherein the unit cells guide electromagnetic signals via band-gap guiding.

8. The waveguide of claim 3, further comprising a center unit cell positioned within the primary core, the center unit cell having a core configured to guide electromagnetic waves having relatively short wavelengths, the relatively long wavelengths being at least twice as long as the relatively short wavelengths.

9. The waveguide of claim 8, wherein the center unit cell comprises multiple open channels formed in the cladding material that are arrayed in a hexagonal pattern around the center unit cell core and wherein the center unit cell guides electromagnetic signals via index guiding.

10. The waveguide of claim 9, wherein the center unit cell comprises multiple hexagonal tubes that are tightly packed in a hexagonal pattern around the center unit cell core and wherein the center unit cell guides electromagnetic signals via band-gap guiding.

11. The waveguide of claim 1, wherein the unit cell is a center unit cell positioned within the primary core.

12. The waveguide of claim 11, further comprising multiple channels formed in the cladding material that are arrayed in a hexagonal pattern around the center unit cell.

13. The waveguide of claim 12, wherein the center unit cell comprises multiple open channels formed in the cladding material that are arrayed in a hexagonal pattern around the center unit cell core and wherein the center unit cell guides electromagnetic signals via index guiding.

14. The waveguide of claim 12, wherein the center unit cell comprises multiple hexagonal tubes that are tightly packed in a hexagonal pattern around the center unit cell core and wherein the center unit cell guides electromagnetic signals via band-gap guiding.

15. A composite photonic crystal waveguide configured to simultaneously transmit relatively short and long wavelength electromagnetic signals, the waveguide comprising:
   a primary core configured to guide electromagnetic waves having relatively long wavelengths;
   multiple peripheral unit cells each having a core configured to guide electromagnetic waves having relatively short wavelengths, the relatively long wavelengths being at least twice as long as the relatively short wavelengths, the peripheral unit cells being arrayed in a hexagonal pattern around the primary core; and
   a single, continuous cladding material that encases the primary core and the unit cells.

16. The waveguide of claim 15, wherein each peripheral unit cell comprises multiple open channels formed in the cladding material, the channels being arrayed in a hexagonal pattern around the unit cell core and wherein the unit cells guide electromagnetic signals via index guiding.

17. The waveguide of claim 15, wherein each peripheral unit cell comprises multiple sub-units formed in the cladding material, the sub-units being arrayed in a hexagonal pattern around the unit cell core, wherein each sub-unit cell comprises its own core.

18. The waveguide of claim 17, wherein each sub-unit cell comprises multiple open channels formed in the cladding material that are arrayed in a hexagonal pattern around the sub-unit cell core and wherein the sub-unit cells guide electromagnetic signals via index guiding.

19. The waveguide of claim 15, wherein each peripheral unit cell comprises multiple hexagonal tubes that are tightly packed in a hexagonal pattern around the unit cell core and wherein the unit cells guide electromagnetic signals via band-gap guiding.

20. The waveguide of claim 15, further comprising a center unit cell located within the primary core, the center unit cell having a core configured to guide electromagnetic waves having relatively short wavelengths, the relatively long wavelengths being at least twice as long as the relatively short wavelengths.

21. The waveguide of claim 20, wherein the center unit cell comprises multiple open channels formed in the cladding material that are arrayed in a hexagonal pattern around the center unit cell core and wherein the center unit cell guides electromagnetic signals via index guiding.

22. The waveguide of claim 20, wherein the center unit cell comprises multiple hexagonal tubes that are tightly packed in a hexagonal pattern around the center unit cell core and wherein the center unit cell guides electromagnetic signals via band-gap guiding.

23. A composite photonic crystal waveguide configured to simultaneously transmit relatively short and long wavelength electromagnetic signals, the waveguide comprising:
   a primary core configured to guide electromagnetic waves having relatively long wavelengths;
   a center unit cell located within the primary core, the center unit cell having a core configured to guide electromagnetic waves having relatively short wavelengths, the relatively long wavelengths being at least twice as long as the relatively short wavelengths;
   a single, continuous cladding material that encases the center unit cell; and
   multiple open channels formed in the cladding material and arrayed in a hexagonal configuration around the primary core.

24. The waveguide of claim 23, wherein the center unit cell comprises multiple open channels formed in the cladding material that are arrayed in a hexagonal pattern around the center unit cell core and wherein the center unit cell guides electromagnetic signals via index guiding.

25. The waveguide of claim 23, wherein the center unit cell comprises multiple hexagonal tubes that are tightly packed in a hexagonal pattern around the center unit cell core and wherein the center unit cell guides electromagnetic signals via band-gap guiding.

26. An waveguide configured to simultaneously transmit relatively short and long wavelength electromagnetic signals, the waveguide comprising:
   a core;
   an inner cladding surrounding the core, the inner cladding having an index of refraction that is lower than the index of refraction of the core such that the inner cladding confines relatively short wavelength electromagnetic signals to the core via index guiding; and
   an outer cladding surrounding the inner cladding, the outer cladding having an index of refraction that is lower than the index of refraction of the inner cladding such that the outer cladding confines relatively long wavelength electromagnetic signals to the inner cladding via index guiding;
   wherein the relatively long wavelengths are at least twice as long as the relatively short wavelengths.

27. A method for simultaneously transmitting relatively short and long wavelength electromagnetic signals, the method comprising:
   transmitting relatively short wavelength electromagnetic signals using a unit cell of a composite photonic crystal waveguide, the unit cell being encased in a cladding material; and
   simultaneously transmitting relatively long wavelength electromagnetic signals using a primary core of the composite photonic crystal waveguide, the primary core being encased in the cladding material, wherein the relatively long wavelengths are at least twice as long as the relatively short wavelengths.

* * * * *